United States Patent [19]

Kudo

[11] Patent Number: 4,760,228
[45] Date of Patent: Jul. 26, 1988

[54] MICROWAVE HEATING DEVICE

[75] Inventor: Minoru Kudo, Niiza, Japan

[73] Assignee: Micro Denshi Co., Ltd., Niiza, Japan

[21] Appl. No.: 3,846

[22] Filed: Jan. 16, 1987

[30] Foreign Application Priority Data

Jan. 16, 1986 [JP] Japan .................................. 61-7002
Mar. 25, 1986 [JP] Japan .................................. 61-67883

[51] Int. Cl.$^4$ ............................................. H05B 9/06
[52] U.S. Cl. ........................ 219/10.55 A; 219/10.55 F
[58] Field of Search ................. 219/10.55 A, 10.55 F,
219/10.55 R, 10.55 M, 10.65; 425/174.8 R,
174.8 E; 264/25, 26, 27

[56] References Cited

U.S. PATENT DOCUMENTS

| | | | |
|---|---|---|---|
| 3,594,530 | 7/1971 | Wiegmann | 219/10.55 A |
| 3,816,689 | 6/1974 | Long | 219/10.55 A |
| 3,848,106 | 11/1974 | Berggren | 219/10.55 A |
| 4,100,386 | 7/1978 | Bardet | 219/10.55 A |

Primary Examiner—A. D. Pellinen
Assistant Examiner—Leon K. Fuller
Attorney, Agent, or Firm—Wegner & Bretschneider

[57] ABSTRACT

A microwave heating device for using microwave energy to heat a high polymer material or the like being conveyed under pressure comprises a hollow, cylindrical microwave waveguide closed at one end and having a metallic shell capable of withstanding high internal pressures, a pressure partition made from a dielectric material provided within said waveguide near an open end thereof so as to define a sealed space between itself and the closed end of said waveguide and to define a path for introduction of microwaves between itself and the open end of said waveguide, a solid or liquid dielectric packing material filling said sealed space and thereby forming a packed dielectric region, said packing material having a lower specific inductive capacity than that of the material to be heated, a passage for pressurized conveyance of the material to be heated, said passage running transversely through said waveguide at said packed dielectric region thereof, and a microwave generator for transmitting microwaves into said waveguide, the pressure within said passage is supported by said waveguide, said pressure partition and the closed end of said waveguide.

8 Claims, 7 Drawing Sheets

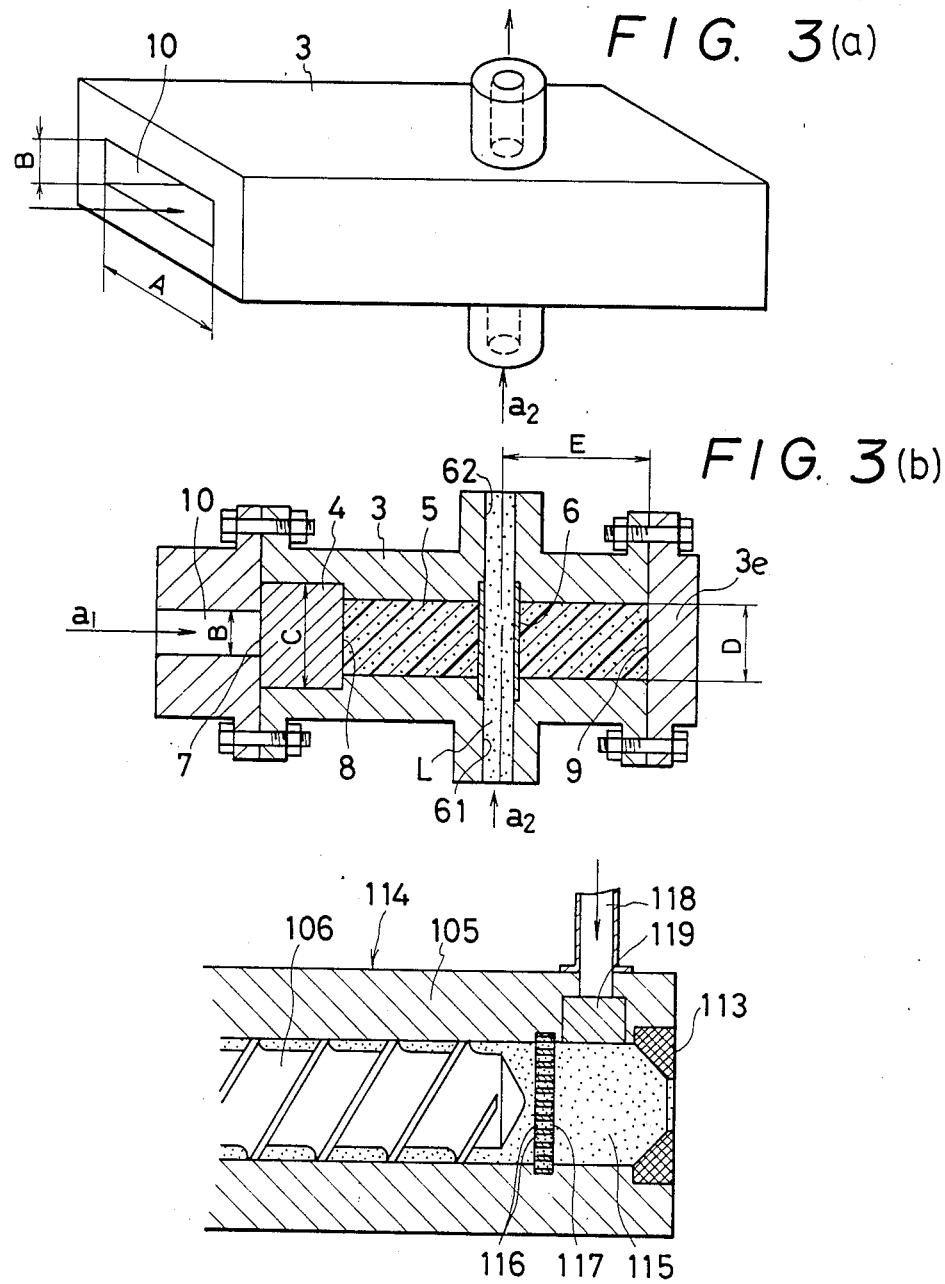

MICROWAVE HEATING DEVICE

BACKGROUND OF THE INVENTION

1. Field of the Invention

This invention relates to a device for efficiently heating a fluid material such as a high polymer material by microwave energy in the course of conveying the material under pressure, as, for example, in a rubber production process. The invention also relates to a device for heat crosslinking a high polymer material in a molding machine.

2. Description of the Prior Art

The perspective view of FIG. 2(a) and the cross-sectional view of FIG. 2(b) illustrate the prior art method for heating a high polymer or other fluid using microwaves. In the illustrated method, microwave energy is guided in the direction of the arrow $a_1$ within a waveguide 1 while a fluid L to be heated is passed through tube 2 made of a dielectric material, and the fluid L is heated in accordance with the principle of dielectric heat generation.

Suitable materials for the dielectric tube 2 used in this method include glass, ceramic and synthetic resins. However, when, as discussed later, an attempt is made to improve the heating efficiency by reducing the wall-thickness of the dielectric tube 2 made of such a low-strength material, the maximum pressure which can be used for pressurized conveyance of the fluid is no more than around 10 Kg/cm$^2$.

In an application of microwave heating to a process involving pressurized conveyance of a plasticized rubber of synthetic resin, however, since the viscosity of the plasticized material is high, it is impossible to realize smooth conveyance of the material unless there is used a high conveyance pressure in the range of 50 Kg/cm$^2$ to 2000 Kg/cm$^2$.

In the method shown in FIG. 2, a dielectric tube 2 capable of withstanding a pressure of 2000 kg/cm$^2$, for example, would have to have a wall thickness of 40 mm or more if made from quartz glass and of 30 mm or more if made from ceramic alumina. While such a tube is both difficult and expensive to fabricate, these are not the major disadvantages encountered when attempting to increase the tube's ability to withstand pressure merely by increasing its wall thickness. An even greater problem is that discussed below.

Consider the case where ceramic alumina is used as the material for the dielectric tube 2. In this case, the specific inductive capacity of the ceramic alumina would, at 9.8, be larger than the specific inductive capacities of about 2.5 to 4.5 of the rubber or synthetic resin to be heated. As a result the fluid L to be heated would be surrounded by a material of a thickness greater than one-half the wavelength of the microwaves and having a specific inductive capacity which is 2 to 4 times greater than its own specific inductive capacity. Under such circumstances, the microwave field would pass straight through the ceramic alumina with the high specific inductive capacity and the fluid L to be heated would be left unaffected.

What this means then is that in carrying out heating of a fluid using the arrangement illustrated in FIG. 2, it is possible to realize efficient microwave heating of the fluid L within the tube only if the wall thickness of the tube is made very small in comparison with the wavelength of the microwaves or, alternatively, the specific inductive capacity of the dielectric tube is not larger than that of the fluid L which is to be heated. Since the upper temperature limit in the heating of a rubber or synthetic resin is in the neighborhood of 200° C., it would appear feasible to use a tube made of tetrafluoroethylene, which has a specific inductive capacity of 2.1, a dielectric dissipation factor of 0.0005 and heat resistance up to 265° C. However, as tetrafluoroethylene resin easily deforms even under a low pressure, it would not be capable of withstanding pressures up to 2000 kg/cm$^2$. It is thus not suitable for use in heating a high-pressure fluid in accordance with the method of FIG. 2.

The prior art has further drawbacks in connection with the application of the microwave heating device to a line for extrusion or injection molding of rubber and the like. As shown in FIG. 5, the prior art line for extrusion molding of rubber and the like comprises an extrusion molding machine 101, a microwave heating device 102 and a secondary heating device 103, provided separately as independent units. Material charged into a hopper 104 is conveyed within a cylinder 105 in the direction of a forming die 107 by a screw 106. The material arriving at the forming die 107 is pushed out through the opening therein in the form of a bar 108 which is supplied to a microwave heating device 102. After being heated to crosslinking temperature by microwave heating, the material is sent to a secondary heating device where it undergoes crosslinking or polymerization reaction.

There are two reasons for providing the extrusion molding machine and the microwave heating device as separate units in this fashion.

(1) The screw 106 conveys the high polymer material under a pressure of 100–500 kg/cm$^2$ and the temperature within the extruder head rises 80°–160° C. Under such conditions it is difficult to build the microwave heating device into the extruder head.

(2) Generally speaking, high polymer materials exhibit poor microwave absorption so that it is difficult using microwaves to heat a small volume of high polymer such as that present within the extruder head. Therefore, as shown in the figure, it has been the practice to provide a separate microwave heating device 102 so as to be able to employ a large microwave irradiation chamber that can accommodate a large volume of high polymer material, in this way enhancing microwave absorption.

However, this type of line arrangement is disadvantageous in that the equipment becomes complicated, bulky and difficult to repair and maintain.

Because of these problems, various proposals have been made regarding ways for raising the high polymer material to the required temperature before extrusion. Typical of these is the arrangement shown in FIG. 6, in which the high polymer material is forced into a heating cylinder 109 from the head of the extrusion molding machine, a rotor 110 housed within the heating cylinder 109 is rotated at the high speed by a motor M and the high polymer material 111 present between the heating cylinder 109 and the rotor 110 is heated by frictional and shearing forces prior to extrusion through a die 112.

While the illustrated arrangement enables heating through control of the rotational speed of the rotor 110, it frequently leads to burning since, there being no way to limit the heating zone to a narrow region immediately preceding the die, the high polymer material is apt to undergo crosslinking reaction before reaching the die. It is thus impossible to readily bring the high polymer material to a high temperature in the region of the die. Moreover, since the high polymer material is heated mechanically by frictional and shearing forces exerted thereon in the course of its conveyance under pressure, there is a risk of the high polymer material being converted into a low polymer material by shearing. What is more, temperature control is difficult.

When a high polymer material is subjected to crosslinking reaction, the viscosity of the high polymer varies with time, as shown in FIG. 7. More specifically, as shown in the drawing, as the temperature rises the viscosity of the high polymer first decreases, and then, with further heating, increases because of crosslinking. Moreover, the time required for completion of crosslinking varies depending on the heating temperature. In FIG. 7, the characteristics of the change in viscosity for low and high temperature heating are represented by the broken and solid line curves, respectively. When the temperature is too low, the high polymer molded by the die is apt to deform under its own weight before curing is complete. On the other hand, if the temperature is too high, crosslinking is completed before the high polymer material passes through the die, which hinders smooth die molding operation and leads to deterioration of the high polymer material.

The best mode of heating is thus one carried out in a very narrow zone immediately before the die, and one which brings the high polymer material to the desired temperature in minimum time.

SUMMARY OF THE INVENTION

One object of the invention is thus to provide a microwave heating device which overcomes the disadvantages found in the conventional method for microwave heating of a high-pressure fluid, can be operated at internal pressures up to around 200 kg/cm$^2$, and can ensure efficient utilization of microwave energy for heating.

Another object of the invention is to overcome the technical problems inherent in the heating and crosslinking device of the conventional extrusion and injection molding machines for high polymer materials by providing a device which enables the high polymer material to be rapidly heated to the desired temperature within a narrow region of the molding machine.

The present invention provides a microwave heating device for using microwave energy to heat a high polymer material or the like being conveyed under pressure comprising a hollow, cylindrical microwave waveguide closed at one end and having a metallic shell capable of withstanding high internal pressures, a pressure partition made from a dielectric material provided within said waveguide near an open end thereof so as to define a sealed space between itself and the closed end of said waveguide and to define a path for introduction of microwaves between itself and the open end of said waveguide, a solid or liquid dielectric packing material filling said sealed space and thereby forming a packed dielectric region, said packing material having a lower specific inductive capacity than that of the material to be heated, a passage for pressurized conveyance of the material to be heated, said passage running transversely through said waveguide at said packed dielectric region thereof, and a microwave generator for transmitting microwaves into said waveguide, the pressure of the material to be heated conveyed through said passage being borne by said waveguide, said pressure partition and the closed end of said waveguide. In other words, the pressure within the passage is supported by the waveguide, the pressure partition, and the closed end of the waveguide. This invention also provides a microwave heating device built into an extrusion molding machine having an extruder section and a head section equipped with a molding die and used for extrusion molding of a high polymer material or the like, said microwave heating device comprising a microwave shield plate disposed as a partition between the extruder section and the head section to define a microwave heating zone between itself and the molding die, said microwave shield plate having a plurality of holes for passage of said material to be molded, a microwave waveguide connected with said microwave heating zone, a pressure partition disposed at the connection point between said waveguide and said microwave heating zone, and a microwave generator for transmitting microwaves into said waveguide.

The above and other features of the present invention will become apparent from the following description made with reference to the drawings.

BRIEF DESCRIPTION OF THE DRAWINGS

FIG. 3(a) is a perspective view and FIG. 3(b) a sectional view of a second embodiment of a microwave heating device according to the invention.

FIG. 4 is a sectional view illustrating a third embodiment of a microwave heating device according to the invention and showing the basic structural arrangement in the application of the microwave heating device according to this invention to an extrusion molding machine for high polymer materials.

DESCRIPTION OF THE PREFERRED EMBODIMENT

Figure 1:
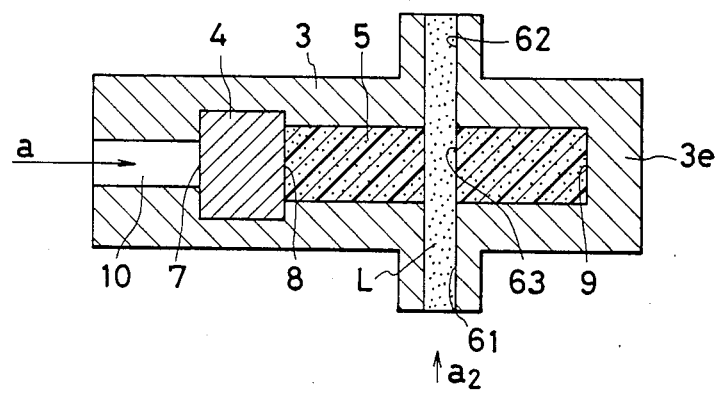
FIG. 1 is a sectional view of a first embodiment of the microwave heating device according to the present invention.

The fundamental principle of the microwave heating device according to the invention will first be explained with reference to the basic arrangement shown in FIG. 1. The illustrated device comprises a hollow waveguide 3 made of metal and closed at one end by an end wall 3e also of metal. The interior of the waveguide 3 is filled with a solid or liquid packing material 5 whose specific inductive capacity is lower than that of a fluid L to be heated. The other end of the waveguide 3 has an opening 10 and a pressure partition 4 is provided within the waveguide 3 between the packing material 5 and the opening 10 so as to seal in the packing material 5 and form a packed dielectric region. Running through the waveguide 3 transversely thereof at the packed dielectric region is a passage consisting of sections 61, 62 penetrating the walls of the waveguide 3 and a section 63 penetrating the dielectric packing material 5. The fluid L to be heated is forced into the passage section 61 as indicated by the arrow $a_z$, whereafter it passes through the passage section 63 penetrating the packing material 5 and then exits from the upper end of the passage 62. Depending on the physical properties of the packing material 5 and the material to be heated, it may not be possible to allow these two materials to come into direct contact and in this case a partition is provided between the packing material 5 and the passage section 63. As the partition there can be used a partitioning cylinder 6 as shown in FIG. 3. While the material to be heated has been referred to as a fluid L in the foregoing, this term is used broadly in this specification and should be understood to include not only liquids but also powder, granular or any other type material capable of being conveyed through a tube or pipe under pressure.

The operation of the device shown in FIG. 1 will now be explained. The fluid L is forced into the passage section 61 as indicated by the arrow $a_2$ and subsequently advances into the passage section 63 through the packing material 5. At the same time, microwave are directed into the interior of the waveguide 3 through the opening 10, whereby the fluid L present in the passage section 63 absorbs the energy of the microwaves and is headted thereby. At this time, there is no problem even if the fluid L is passed through the passage 63 under high pressure since the pressure is transferred through the packing material 5 and absorbed by the inner wall of the waveguide 3, the end wall 3e of the waveguide 3 and the pressure partition 4. As a result, all that need be done to enable heating of a highly pressurized fluid L is to make adequately thick the members enclosing the packing material 5, namely the wall of the waveguide 3, the end wall 3e and the pressure partition 4. In a case where the packing material 5 and the fluid L are separated by a partition cylinder, the pressure of the fluid L is transferred through the packing material and borne by the wall of the waveguide and the pressure partition 4, both of which are adequately strong, so that there is no danger of deformation of the partitioning cylinder. Therefore, no problem arises even if the partitioning cylinder has a thin wall of low strength.

A more practicable embodiment of the microwave heating device according to the invention is shown in FIG. 3. In this embodiment, the microwave energy is introduced into a waveguide in the direction indicated by the arrow $a_1$, while the fluid L to be heated is forced into the device under pressure in the direction of the arrow $a_2$. The waveguide 3 is fabricated of a metallic material and with such a wall thickness as to ensure a rigidity capable of withstanding an internal pressure of 2000 kg/cm$^2$. The reference numeral 4 denotes a pressure partition formed of a material which passes microwaves with minimal energy loss, and which exhibits high compression and bending strength.

Figure 2A:
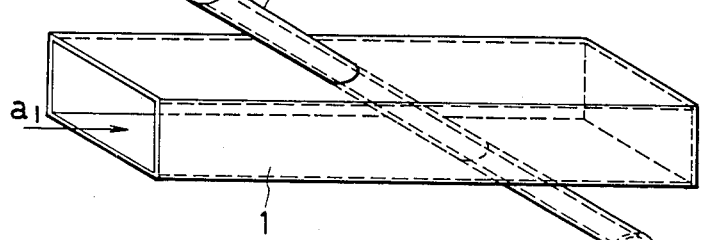
FIG. 2 is a perspective view of prior art microwave heating device.
Figure 2B:
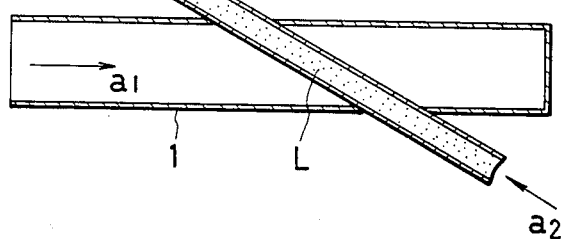
Figure 5:
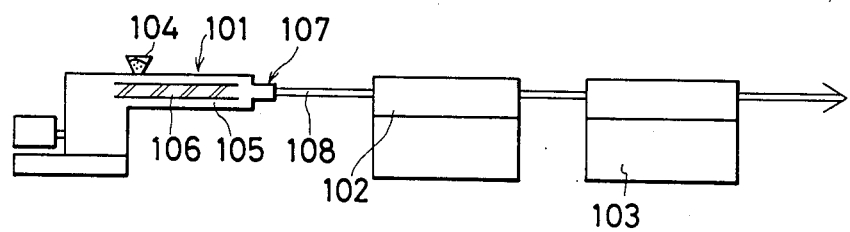
FIG. 5 is a schematic view of a prior art microwave heating line.
Figure 6:
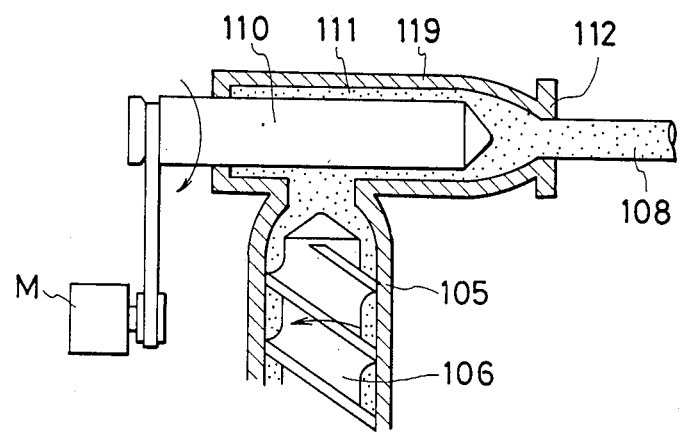
FIG. 6 is a sectional view of a mechanical type heating and crosslinking device according to the prior art.
Figure 7:
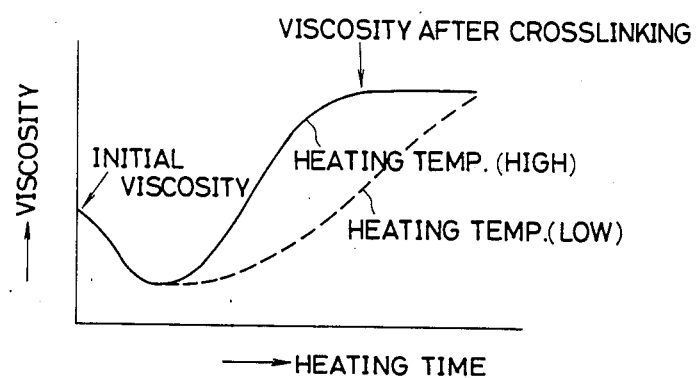
FIG. 7 is a graph showing the relation between heating time and high polymer material viscosity in the heat-induced crosslinking of a high polymer material.

The specific inductive capacity of this material is irrelevant. The reference numeral 5 denotes a packing material which is required to have a specific inductive capacity of not more than 2.5, a low dielectric dissipation factor and heat resistance up to 200° C., and not to exhibit any reduction in volume under a pressure of 2000 kg/cm$^2$. The packing material may be either a solid or a liquid. By reference numeral 6 is denoted a partitioning cylinder through which the fluid L passes in the region of the packing material 5. The partitioning cylinder is of a dielectric material which is capable of preventing leakage of the packing material 5 into the passage for the liquid L and will not wear under abrasive contact with the liquid L. The wall of the partitioning cylinder 5 may be made thin as the cylinder is not required to withstand the pressure of the liquid L. If desired, the partitioning cylinder 6 can be oriented at an angle as shown in FIG. 2.

Considering the aforesaid conditions, the materials usable for the pressure partition 4 include ceramic alumina, ceramic steatite and quartz glass, materials for the packing material include fluoroplastics and silicone oil, the most preferable of these being tetrafluoroethylene, and the material for the partitioning cylinder can be quartz glass. With the arrangement illustrated in FIG. 3, the pressure of the fluid L can be fully borne by pressure partition 4 and the waveguide 3 via the packing material 5 so that the partitioning cylinder need not be made strong enough to withstand the internal pressure. In other words, the pressure within the partitioning cylinder can be fully supported by pressure partition 4 and waveguide 3 via packing material 5. As a result, the wall thickness of the partitioning cylinder 6 can be made extremely thin in comparison with the microwave wavelength so that there arises no problem of reduced efficiency of utilization of the microwave energy for heating even when the partitioning cylinder is made of a material having a somewhat high specific inductive capacity. While the packing material 5 should preferably have a specific inductive capacity which is lower than that of the fluid L, it is not required to have high mechanical strength. As the material it is thus possible to use an easily deformable material such as a fluoroplastic, or silicone oil.

Consideration will now be given to means for preventing microwave reflection.

When microwave travel along a path including dielectric materials exhibiting different specific inductive capacities, the microwave transmission impedance is inversely proportional to the specific inductive capacities of the respective dielectrics. When there is an interface at which the specific inductive capacity changes abruptly, i.e. an interface at which the transmission impedance changes abruptly, the microwave is reflected at the interface. In this case, the magnitude of the reflected wave corresponds to the ratio of the transmission impedances on opposite sides of the interface. In the device of FIG. 3(b), the transmission impedance changes abruptly at four places; at the interfaces denoted at 7, 8 and 9 and at the interface between the partitioning cylinder 6 and the fluid L. As the reflection at the interface between the partitioning cylinder 6 and the fluid L will very depending on the type and composition of the fluid L, it is necessary to minimize reflective loss by separately providing a stub tuner or othen such impedance matching box. The reflection at the interfaces 7 and 8 is determined by the materials of the pressure partition 4 and the packing material 5 so that these materials should be selected with a view to reducing reflection at these interfaces to the absolute minimum.

There are three ways of reducing reflection at the interfaces 7 and 8. One is to form the pressure partition 4 as thin rods of rhombic cross-section with the length of the rods lying in the direction of microwave travel. This method is, however, not practical since it increases the size and cost of the device.

In contrast, either of the second and third methods are compatible with the aim of this invention, which is to provide an inexpensive device for efficiently heating a pressurized liquid using microwaves.

The microwave transmission impedance within the waveguide depends on the A and B dimensions of the opening 10. Where A is maintained constant, the transmission impedance will increase as B is increased and decrease as B is decreased. Where B is maintained constant, the transmission impedance will decrease as A increases. On the other hand when is A made equal to one-half of the microwave wavelength, the transmission impedance becomes infinite. Where the interior of the waveguide is filled with a dielectric material, differently from the case of a hollow waveguide, the transmission impedance is inversely proportional to the square root of the specific inductive capacity of the dielectric material.

The second method of reducing interfacial reflection utilizes the aforesaid nature of the microwaves. In this method, the internal dimensions of the waveguide are so selected with relation to the specific inductive capacities of the hollow portion 10 of the waveguide preceding the front face of the pressure partition 4, the pressure partition 4 and the packing material 5 that the transmission impedance is the same at all of these regions. More specifically, the magnitudes of B, C and D are so selected as to produce impedance-matched interfaces 7 and 8 that are non-reflective. Then the dimension D is determined with relation to the specific inductive capacity of the packing material 5 so as to realize the same transmission impedance as that of the pressure partition 4. What turns out to be particularly convenient in this connection is that when the aforesaid conditions for selection of the materials for the pressure partition 4 and the packing material 5 are satisfied, the magnitude of C becomes larger than those of B and D, and this matches perfectly with the desirability of providing a recess into which to fit the pressure partition 4 so that it will be better able to bear the pressure of the liquid L.

The third method is fairly similar to the second, but differs in that it permits some degree of freedom in setting the magnitude of C. Where the magnitude of D is set so that the transmission impedance of the hollow portion 10 of the waveguide 3, which is determined by the magnitude of B, and the transmission impedance of the packing material 5 become equal and the magnitude of C is set as desired, there naturally occurs a certain amount of reflection of the microwaves incident on the interfaces 7 and 8. However, if a material with a very small dielectric loss is used for the pressure portition 4, the amount of reflection from the interfaces 7 and 8 will become approximately equal. If under these conditions, the thickness of the pressure partition 4 is made equal to one-fourth the microwave wavelength, the reflected waves at the interfaces 8 and 9 will be of reverse phase and cancel each other out, resulting in non-reflective matched interfaces.

Since the interface 9 is totally shorted by metal, the microwaves reaching this interface are totally reflected and interfere with the waves being sent from the microwave source, thus producing a standing wave.

The heating efficiency can be further enhanced by setting the distance E between the interface 9 and the center of the passage for the liquid L such that the position of maximum electrical potential of the standing wave produced by the reflection from the interface 9 falls at the center of the passage.

An experiment was conducted using the microwave heating device shown in FIG. 3 in which synthetic rubber conveyed under a pressure of 500 kg/cm$^2$ was heated by microwaves. When the synthetic rubber was heated from 80° C. to 160° C., it was found that the energy utilization efficiency was about 90%. The reflection loss at the interfaces was 2% of the microwave transmission power. The remainder of the loss is considered to have been due to heat that was conducted from the rubber to the waveguide 3 and then dissipated into the atmosphere. There is known no other heating method capable of heating a rubber material at such a high heating efficiency.

In the aforesaid arrangement according to the invention a packing material 5 having a lower specific inductance capacity than the fluid L is sealed within the waveguide 3 by a pressure partition 4 and the fluid L is forced through a passage penetrating the packing material 5. As a result, the pressure of the fluid L is passed through the packing material 5 and borne by the waveguide 3 and the pressure partition 4, both of which are of rigid construction. In other words, the pressure within the passage is supported by waveguide 3 and pressure partition 4. Therefore, the materials used for the various components of the device can be selected with considerable freedom and it becomes possible to carry out efficient microwave heating even of a fluid under high pressure. While in some cases, it may be necessary to provide a partitioning cylinder to keep the packing material 5 separated from the liquid L, the pressure of the liquid L is transferred through the partitioning cylinder and the packing material to the waveguide 3 and the pressure partition 4 so that the wall thickness of the partitioning cylinder can be made much thinner than, for example, that of the conventional tube 2 shown in FIG. 2.

A third embodiment of the microwave heating device according to the invention is shown in FIG. 4. This embodiment of the device is built into the head of an extrusion molding machine comprising a molding die 113 and an extruder section 114 including a screw 106. More specifically, the microwave heating device is constituted so as to form a microwave heating zone within a space 115 defined between the extruder section 114 and the molding die 113, with the microwave heating zone 115 being partitioned from the extruder section 114 by a microwave shield plate 117 having numerous small holes 117 for passage of high polymer material. The microwave heating zone 115 is further partitioned from a microwave waveguide 118 by a pressure partition 119.

In this embodiment, raw high polymer material is conveyed to the head region by the extruder section 114 of the extrusion molding machine and is further forced through the small holes 116 of the microwave shield plate and into the microwave heating zone 115. As the microwave heating zone 115 is supplied with microwave via the waveguide 118, the high polymer material in the microwave heating zone 115 is heated by the microwave energy, whereafter it is extruded through the molding die 113 and thus molded. Here it should be noted that since the microwave waveguide 118 and the microwave heating zone 115 are separated by the pressure partition 119, the high polymer material in the microwave heating zone 115 is prevented from entering the microwave waveguide 118.

Figure 8:
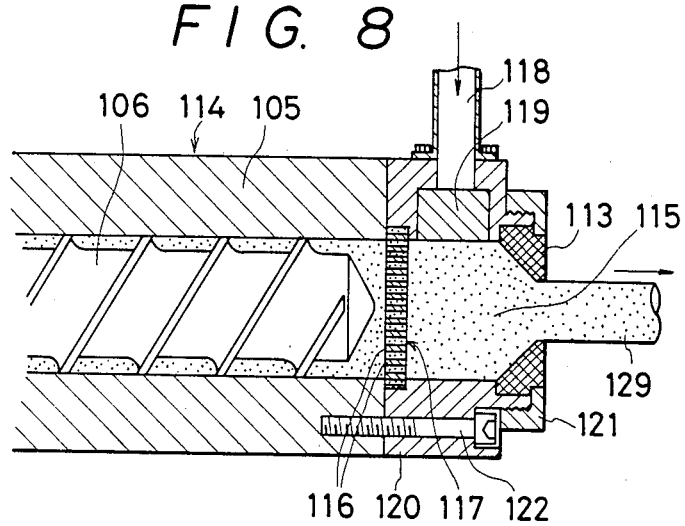
FIG. 8 is a sectional view of a fourth embodiment of a microwave heating device according to this invention as applied as a heating and crosslinking device in an extrusion molding machine for high polymer materials.
Figure 9:
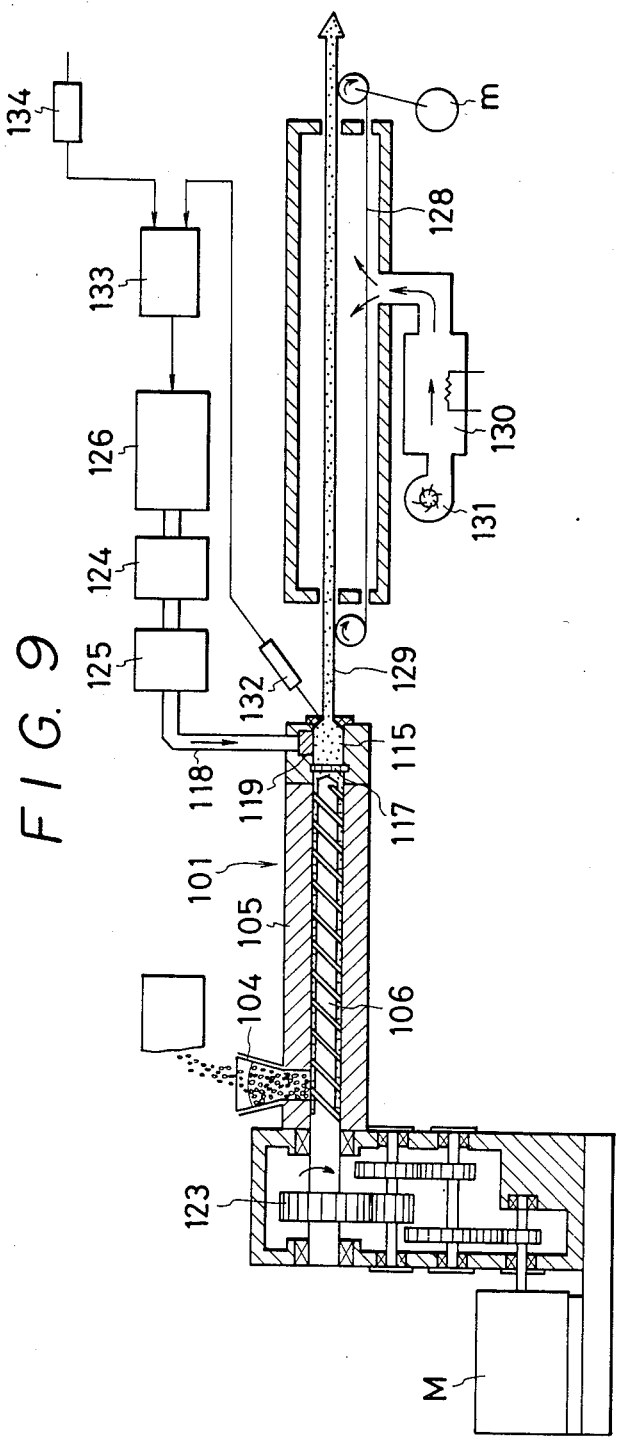
FIG. 9 is a sectional view of a heating line employing the embodiment of FIG. 8.

FIG. 8 shows a fourth embodiment of the microwave heating device according to the invention as applied as a highly practical heating and crosslinking device in an extrusion molding machine for use with high polymer materials. FIG. 9 is a sectional view showing the aforesaid extrusion molding machine incorporated in an extrusion molding line. As seen in FIG. 8, the extrusion molding machine is formed with a microwave heating zone 115 and a microwave waveguide 118 separated from the microwave heating zone 115 by a pressure partition 119 made from quartz or ceramic alumina. A molding die 113 is fixed to the tip end of the head unit 120 by a box nut 121 and the head unit is fixed to a cylinder 105 of the extrusion molding machine by bolts 122 (only one shown) in such manner as to clamp a metallic microwave shield plate 117 between the head unit 120 and the cylinder 105.

The extrusion head section described above constitutes one part of an extrusion molding machine 101 as shown in FIG. 9. The extrusion molding machine 101 further comprises a hopper 104 for feeding raw material into the cylinder 105 and a screw 106 for forcing the raw material fed continuously from the hopper 104 toward the extruder head. The screw 106 is rotated by a motor M though a reduction gear box 123.

The microwave shield plate 117 has numerous small holes 116 through which the material is forced into the microwave heating zone 115. The diameter of these holes 116 is made smaller than one-quarter of the microwave wavelength, whereby the microwave shield plate acts as a total reflector with respect to the microwaves. The microwaves are thus prevented from entering the region of the screw 116 and cylinder 115 so that the microwave heating is restricted solely to the microwave heating zone 115.

As the pressure partition 119 receives the pressure of the high polymer material passing through the molding die, the magnitude of which depends on the viscosity and molding velocity of the high polymer material, the material of the pressure partition 119 is required to be able to withstand this pressure and to exhibit a low microwave loss. As, however, the viscosity of the high polymer material is reduced by microwave heating before passing through the die, the pressure exerted on the pressure partition is not so large. (Generally in the range of 50–300 kg/cm$^2$.) Therefore, the thickness of the pressure partition 119 need only be about 15 mm even when made from quartz glass, meaning that there is considerable freedom in selecting the material thereof.

However, in view of the fact that the screw of an extrucion molding machine generally has a diameter of 60–150 mm, it is necessary for the internal volume of the microwave heating zone to be a relatively small value of 180–900 cm$^2$. This is because the time period between the instant that the high polymer material passes through the microwave shield plate 117 and the instant the same material passes through the molding die 113, i.e. the time period required for it to traverse the microwave heating zone 115, has to be shorter than the time period during which the viscosity is shown to fall by the curve in FIG. 4. Thus the residence period of the high polymer material in the microwave heating zone 115 is no more than 30 seconds. If the residence time is longer than this, the high polymer material will be passing through the molding die 113 after the crosslinking reaction has begun, in which case it will become impossible to obtain good quality molded products because the resistance between the high polymer material and the molding die 113 will increase and cracks and surface irregularities will form in the molded high polymer material.

As shown in FIG. 8, the microwaves used for the heating operation are produced by a microwave generator 126. If microwave energy equivalent to electric power in the range of 5–20 KW should be applied to the small volume of high polymer material in the microwave heating zone 115, a considerable amount of reflected electric power would be produced in the direction of the microwave generator 126 since the ability of the high polymer material to absorb microwaves is low. As a result, the energy utilization efficiency would be low. To overcome this problem, a reflected power monitor 124 and an impedance matching box 125 are provided in the wavegude 118 between the microwave generator 126 and the microwave heating zone 115. The reflected power monitor measures the amount to reflected electric power, the amount of which varies depending on the type of high polymer material and what type of reinforcement filler such as carbon and the like is blended with it. The impedance matching box is constituted as a variable three-stub impedance matching box or EH impedance matching box and functions to reduce the amount of reflected electric power by load matching.

Crosslinking reaction in the high polymer material hanted in this way does not being immediately with its extrusion through the molding die 113 and one to three minutes are required for 100% completion of the reaction. If the high polymer material is simply left to stand during this period, the crosslinking reaction will slow or stop as the material cools off, making it impossible to obtain good quality products. It is therefore necessary to maintain the material at the temperature it had at the time of passing through the molding die. For this puopose there are provided a secondary heating furnace 127 of the hot-air or infrared heater type (a hot-air type furnace being shown in FIG. 9). The furnace 127 is provided with a conveyor 128 driven by a motor m for guiding and conveying the hot molded product 129 into and through the furnace 127. The interior of the furnace 127 is kept at a prescribed temperature by using a blower 131 to blow hot air heated by an electric heater 130 thereinto. In this connection, it should be noted that the purpose of the furnace 127 is merely to keep the heated high polymer material (the molded product 129) from cooling and, as such, does not require a great deal of energy.

A low power electric heater will thus suffice.

An infrared radiation detector 132 is disposed at the outlet of the molding die 113 for detecting the temperature of the molded product 119 immediately after it is extruded from the molding die 113 and sending a signal representing the detected temperature to a comparator 133 which also recieves a set temperature signal from a temperature setting device 134. The comparator 133 compares the two signals and sends a difference signal representing the difference between the set and actual temperatures to the microwave generator 126. The microwave generator is controlled by the difference signal so as to reduce the difference between the fixed and actual temperatures and thus maintain the microwave heating zone 115 at a constant temperature suitable for crosslinking reaction.

The main advantage of this fourth embodiment of the invention is its ability to heat the high polymer material to the required crosslinking reaction temperature in a mere 10-20 seconds while it is being conveyed over a distance of only 5-6 cm, and to be above to achieve this using a highly responsive energy such as microwaves so that temperature control can be carried out almost instantaneously. Also, since transmission of the microwave energy into the cylinder 105 is prevented by the microwave shield plate 117, there is no marring of the screw or inside surface of the cylinder, making it possible to obtain a product that is free of burn marks.

Figure 10:
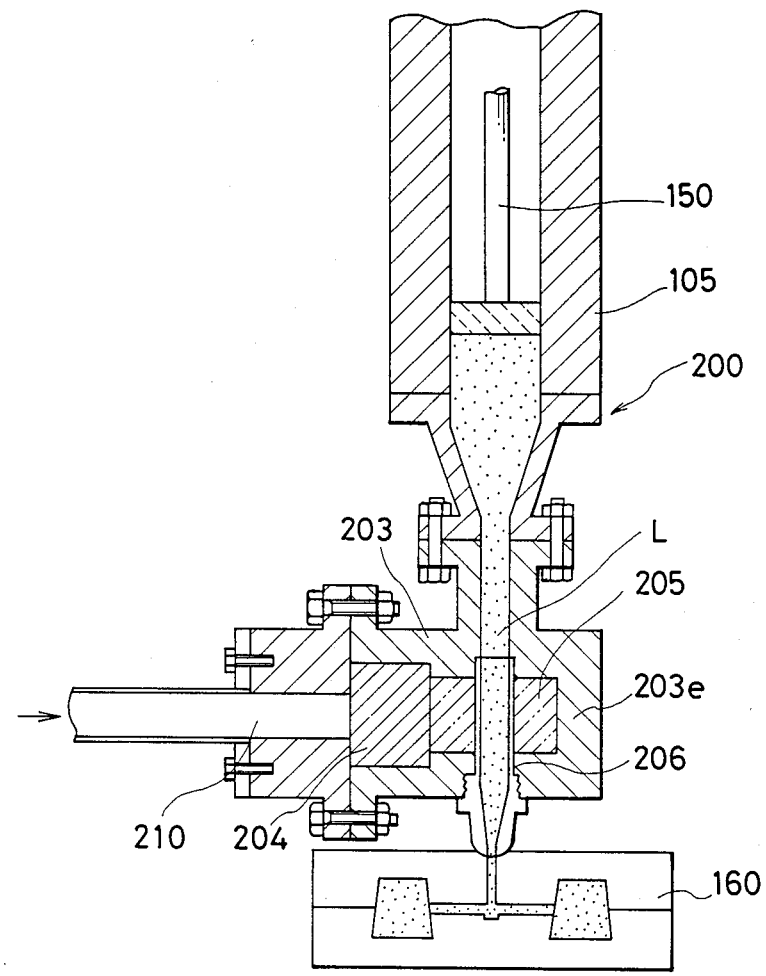
FIG. 10 is a sectional view of a fifth embodiment of a microwave heating device according to this invention as applied in a plunger type injection molding machine.
Figure 11:
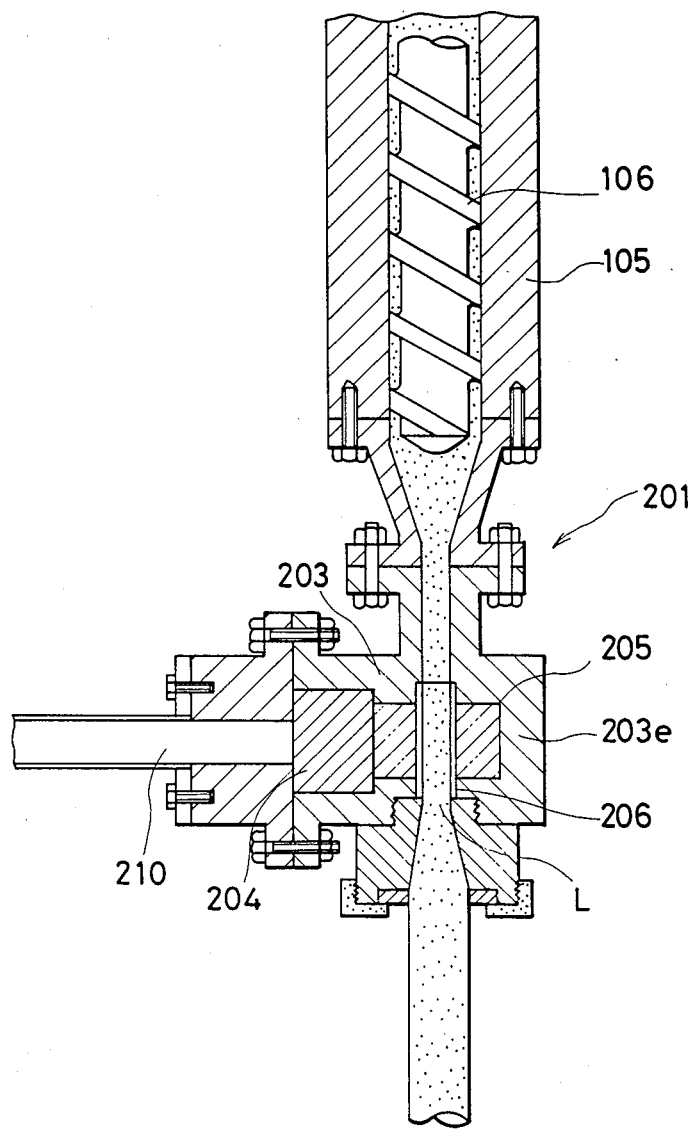
FIG. 11 is a sectional view of a sixth embodiment of a microwave heating device according to this invention as applied in a screw type extrusion molding machine.

FIGS. 10 and 11 show embodiments of the invention as applied in the head portion of a plunger-type and a screw-type molding machine.

Referring to FIG. 10, there is shown a plunger-type injection molding machine 200 in which high polymer material L is forcibly advanced by pressure from a plunger 150. FIG. 11 shows are extrusion molding machine 201 similar to the injection molding machine 200 but having a screw 106 instead of the plunger 150.

The plunger-type extrusion molding machine 200 is adapted for extruding a high polymer material, particularly a rubber material, by a process wherein the rubber material is preheated to a temperature of 80°-90° C., and is highly viscous, and is then heated and forced under pressure through a nozzle into a mold 160 maintained at a temperature of 150°-180° C. The mold 160 is equipped with a high-temperature water heater (not shown) and the heat from its cavity wall conducts into the rubber material to vulcanize it. As the rubber material is a poor heat conductor, depending on the product thickness it may take from 2 to 10 minutes for vulcanization to proceed to the center region. This time can, however, be reduced by preheating the rubber material up to the temperature of the mold before charging it into the mold. Experiments show that, in the temperature range of 110°-160° C., the time required for vulcanization can be reduced to about one-half by increasing the temperature by about 10° C. (Principle of equivalent vulcanization.)

Up to now, however, there has been no appropriate device for uniformly raising the temperature of the rubber material. One of the main difficulties has been that conventional heating methods tend to raise the surface temperature of the rubber material too high, causing burning and producing an unevenly cured product.

When the head portion of an extrusion molding machine is equipped with the microwave heating device according to this invention, it becomes possible to use microwaves to further heat the preheated rubber material up to a temperature of 150°-160° C. This increase in temperature has the effect of increasing the fluidity of the rubber material, which in turn means that it is possible to use a lower injection pressure and a lower mold clamping pressure than heretofore. As a result, the equipment as a whole can be made considerably lighter.

Experiments showed that an amount of rubber material requiring 600-700 seconds (about 10 minutes) for completion of vulcanization according to the conventional method can, when molded using an injection molding machine equipped with the microwave heating device according to this invention, be vulcanized in 60-100 seconds (1-1.5 minutes). Moreover, as the application of this invention also increases the fluidity of the rubber material, the spool and the runners within the mold can be made smaller, and the amount of remaining (wasted) rubber material is less, which is economically advantageous. Also, while it has conventionally been necessary to use an injection pressure of 1700 kg/cm$^2$, this can be reduced to 600-700 kg/cm$^2$. As a result, the weight of the mold can be reduced from the conventional 50-150 t to around 15 t.

Substantially the same advantages as described with respect to the plunger-type injection molding machine of FIG. 10 can also be obtained when the invention is applied to the a screw-type extrusion molding machine as shown in FIG. 11.

The present invention has thus beem shown and described with reference to specific embodiments. However, it should be noted that the present invention is in no way limited to the details of the described arrangement but changes and modifications may be made without departing from the scope of the appended claims.

I claim:

1. A microwave heating device for using microwave energy to heat a high polymer material or the like being conveyed under pressure comprising
   a hollow, cylindrical microwave waveguide closed at one end and having a metallic shell capable of withstanding high internal pressure,
   a pressure partition made from a dielectric material provided within said waveguide near an open end thereof so as to define a sealed space between itself and the closed end of said waveguide and to define a path for introduction of microwaves between itself and the open end of said waveguide,
   a solid or liquid dielectric packing material filling said sealed space and thereby forming a packed dielectric region, said packing material having a lower specific inductive capacity than that of the material to be heated,
   a passage for pressurized conveyance of the material to be heated, said passage running traversely through said waveguide at said packed dielectric region thereof,
   and a microwave generator for transmitting microwaves into said waveguide,
   wherein the pressure within said passage is supported by said waveguide, said pressure partition and the closed end of said waveguide.

2. A microwave heating device according to claim 1, wherein reflection loss of the microwaves is reduced and heating efficiency of the material to be heated is increased by setting the inside dimensions of said waveguide with reference to the materials of said pressure partition so as to match the impedance among said path for introduction of microwaves, said pressure partition and said packed dielectric region.

3. A microwave heating device according to claim 1, wherein said path for introduction of microwaves and said packed dielectric region are matched to the same impedance and a non-reflective state is realized by setting the inner dimensions of said waveguide in accordance with the specific inductive capacities of said pressure partition and said path for introduction of microwaves, and thereafter setting the thickness of said pressure partition so that the microwaves reflected by the interface between said path for introduction of microwaves and said prossure partition and the microwaves reflected from the interface between said pressure partition and said packed dielectric region cancel out.

4. A microwave heating device built into an extrusion molding machine having an extruder section and a head section equipped with a molding die and used for extrusion molding of a high polymer material or the like, said microwave heating device comprising
   a microwave shield plate disposed as a partition between the extruder section and the head section to define a microwave heating zone between itself and the molding die, said microwave shield plate having a plurality of holes for passage of said material to be molded,
   a microwave waveguide connected with said microwave heating zone,
   a pressure partition disposed at the connection point between said waveguide and said microwave heating zone,
   and a microwave generator for transmitting microwaves into said waveguide.

5. A microwave heating device according to claim 4 further provided in said waveguide between said microwave generator and said microwave heating zone with a reflected power monitor and an impedance matching box for eliminating or reducing power reflection from the material to be molded.

6. A microwave heating device according to claim 1, characterized in that it is disposed in the head section of an extrusion or injection molding machine for a high polymer material or the like.

7. A microwave heating device according to claim 6 wherein the molding machine uses a screw for advancing the material to be molded.

8. A microwave heating device according to claim 6 wherein the molding machine uses a plunger for advancing the material to be molded.

* * * * *